US012608888B2

(12) United States Patent
Holmes et al.

(10) Patent No.: US 12,608,888 B2
(45) Date of Patent: Apr. 21, 2026

(54) MESH STITCHING FOR MOTION ESTIMATION AND DEPTH FROM STEREO

(71) Applicant: QUALCOMM Incorporated, San Diego, CA (US)

(72) Inventors: Samuel Benjamin Holmes, Sterling, MA (US); Jonathan Wicks, Lafayette, CO (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 18/458,957

(22) Filed: Aug. 30, 2023

(65) Prior Publication Data
US 2025/0078410 A1      Mar. 6, 2025

(51) Int. Cl.
 *G06T 17/20* (2006.01)
 *G06T 7/12* (2017.01)
 (Continued)

(52) U.S. Cl.
 CPC .............. *G06T 17/205* (2013.01); *G06T 7/12* (2017.01); *G06T 7/248* (2017.01); *G06T 7/593* (2017.01);
 (Continued)

(58) Field of Classification Search
 CPC ................... G06T 15/40; G06T 17/205; G06T 2207/10012; G06T 2207/10021;
 (Continued)

(56) References Cited

U.S. PATENT DOCUMENTS

2015/0338204 A1*  11/2015  Richert .................... G06T 7/593
                                                                       348/135
2016/0014426 A1*  1/2016  Richert .................... G06T 7/579
                                                                       375/240.16
(Continued)

FOREIGN PATENT DOCUMENTS

CA          2466247 A1    11/2005

OTHER PUBLICATIONS

Dos Anjos R.K., "Metameric Inpainting for Image Warping", IEEE Transactions on Visualization and Computer Graphics, vol. 29, No. 12, Oct. 24, 2022, pp. 5511-5522, XP011953151, ISSN: 1077-2626, DOI: 10.1109/TVCG.2022.3216712, abstract figures 1,3 p. 5518, left-hand column, paragraph 1 Bridging par. between columns; p. 5513.
(Continued)

*Primary Examiner* — Ming Wu
(74) *Attorney, Agent, or Firm* — Procopio, Cory, Hargreaves & Savitch LLP

(57) ABSTRACT
This disclosure provides systems, devices, apparatus, and methods, including computer programs encoded on storage media, for mesh stitching for motion estimation and depth from stereo. A processor may obtain an indication of a mesh associated with a set of motion vectors for a first frame and a second frame in a plurality of frames. The processor may detect a set of regions in the mesh including a set of motion disparity values associated with the set of motion vectors, where each motion disparity value in the set of motion disparity values is less than a coherency threshold. The processor may calculate an adjustment to the mesh based on the region. The processor may output an indication of the adjustment to the mesh.

30 Claims, 12 Drawing Sheets

300

302

(51) Int. Cl.
*G06T 7/246* (2017.01)
*G06T 7/593* (2017.01)
*G06T 15/40* (2011.01)

(52) U.S. Cl.
CPC .... *G06T 15/40* (2013.01); *G06T 2207/10012* (2013.01); *G06T 2210/44* (2013.01)

(58) Field of Classification Search
CPC ......... G06T 2210/44; G06T 5/20; G06T 5/77; G06T 7/12; G06T 7/248; G06T 7/593
See application file for complete search history.

(56) References Cited

U.S. PATENT DOCUMENTS

| | | | |
|---|---|---|---|
| 2018/0074637 A1* | 3/2018 | Rosenberg | .......... G06F 3/04166 |
| 2022/0121884 A1* | 4/2022 | Zadeh | ................... G06N 3/006 |

OTHER PUBLICATIONS

International Search Report and Written Opinion—PCT/US2024/042814—ISA/EPO—Nov. 27, 2024.

* cited by examiner

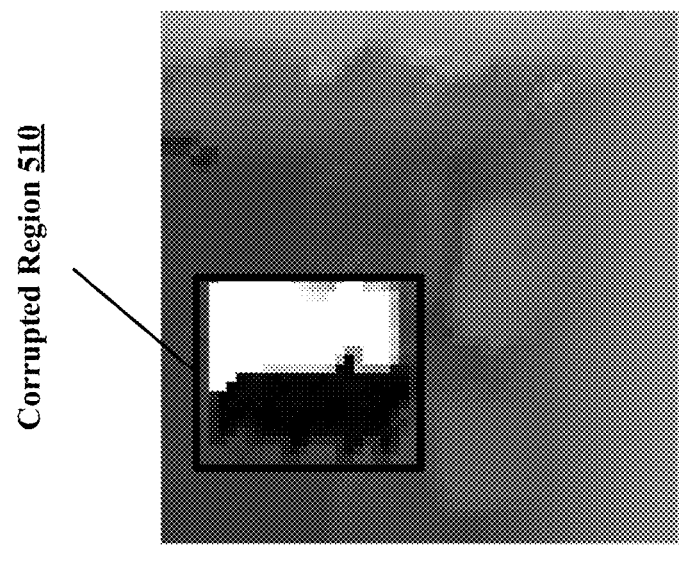
Corrupted Region 510
Disparity Map 506
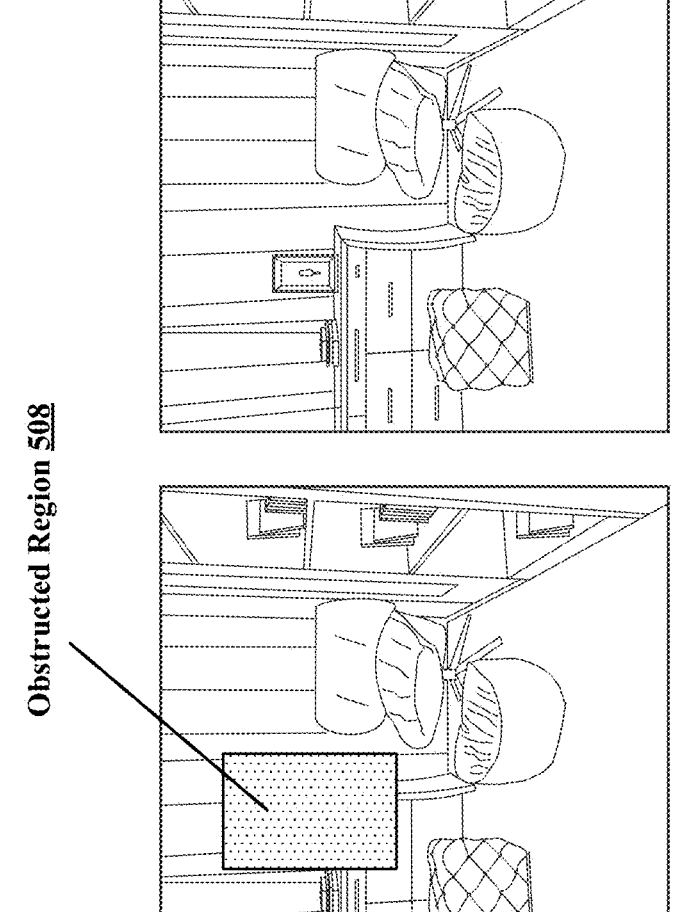
Obstructed Region 508
Right Eye Image 504
Left Eye Image 502
500
FIG. 5

ME 605

OR

R-L DFS 604

L-R DFS 602

Bi-Directional Comparison 606

Expansion Filtering 608

Mesh Stitching 610

600

Interpolated DFS Output 708

Stitched Mesh 706

Vertex 718

Stitched Region 717

Non-Flagged Region(s) 714

Flagged Region(s) 710

Flagged Region 712

Bi-Directional Comparison Result 702

Expanded Flagged Region 716

Expanded Bi-Directional Comparison Result 704

700

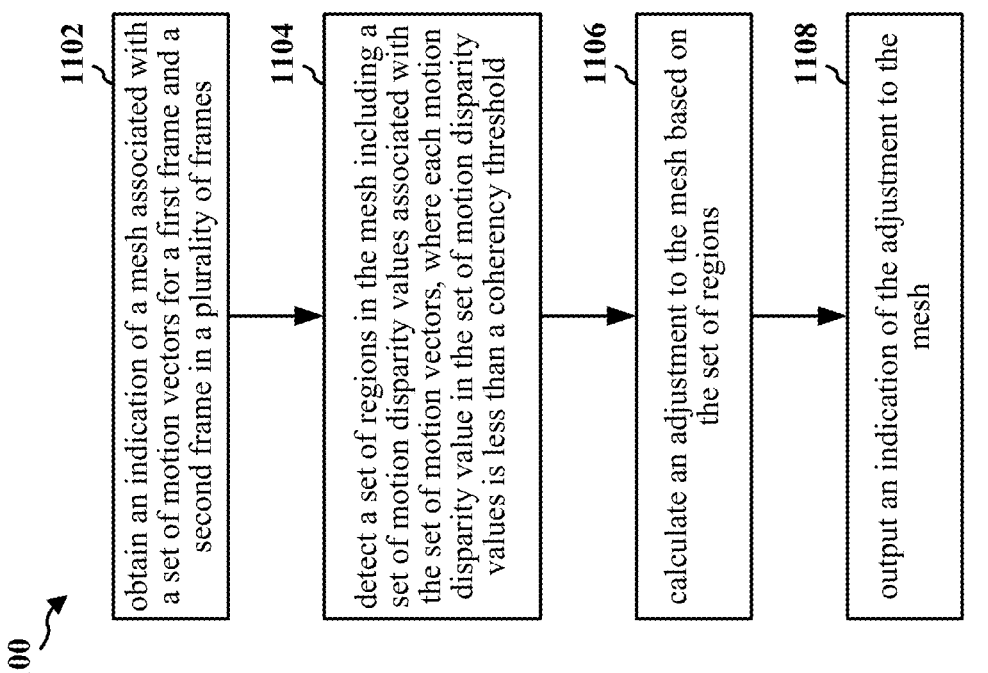

1100

1102 obtain an indication of a mesh associated with a set of motion vectors for a first frame and a second frame in a plurality of frames

1104 detect a set of regions in the mesh including a set of motion disparity values associated with the set of motion vectors, where each motion disparity value in the set of motion disparity values is less than a coherency threshold

1106 calculate an adjustment to the mesh based on the set of regions

1108 output an indication of the adjustment to the mesh

FIG. 11

MESH STITCHING FOR MOTION ESTIMATION AND DEPTH FROM STEREO

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for motion estimation (ME) and depth from stereo (DFS) may encounter difficulties in cases in which occlusion or disocclusion of content results in poor quality vectors or poor quality disparity values due to content being entirely present or entirely not present in a frame of a frame pair. There is a need for improved techniques for ME and DFS.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a memory; and a processor coupled to the memory and, based on information stored in the memory, the processor is configured to: obtain an indication of a mesh associated with a set of motion vectors for a first frame and a second frame in a plurality of frames; detect a set of regions in the mesh including a set of motion disparity values associated with the set of motion vectors, where each motion disparity value in the set of motion disparity values is less than a coherency threshold; calculate an adjustment to the mesh based on the region; and output an indication of the adjustment to the mesh.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating an example of a left eye image, a right eye image, and a disparity map in accordance with one or more techniques of this disclosure.

FIG. 11 is a flowchart of an example method of graphics processing in accordance with one or more techniques of this disclosure.

DETAILED DESCRIPTION

Figure 1:
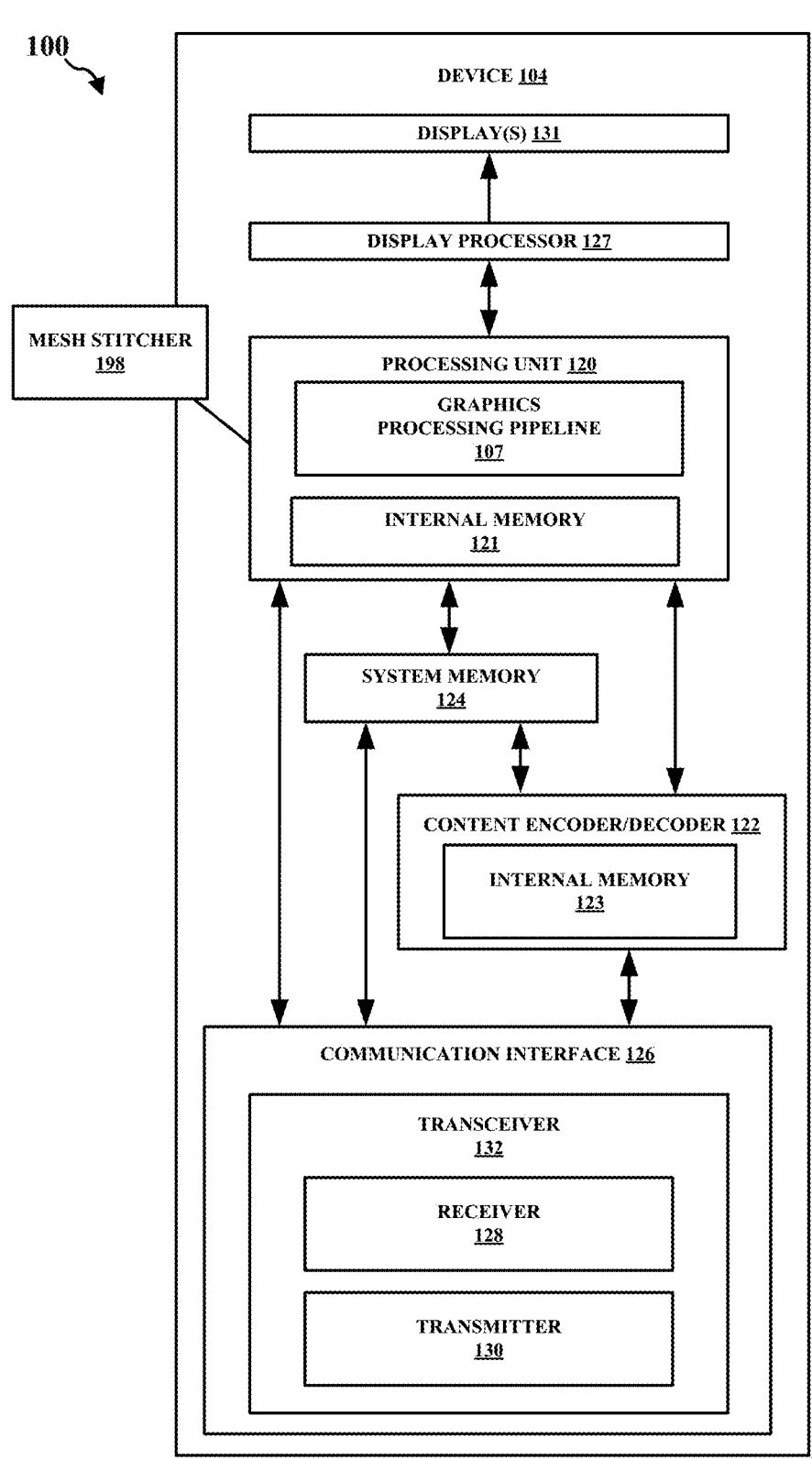
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Motion Estimation (ME) and Depth from Stereo (DFS) may refer to two image-based techniques to produce motion vectors/disparity values between a pair of images. A motion vector may refer to a 2D quantity that describes a transformation from a location in a first 2D image to a second location in a 2D image (e.g., the amount of X and Y movement an object makes in adjacent video frames). A disparity value may refer to a 1D quantity which describes a shift along a single axis from a first location in a 2D image and a second location in the 2D image (e.g., the amount an object moves in X between a left and right image in a stereo pair of images). Both ME and DFS may have to handle challenging content cases where occlusion or disocclusion causes poor quality motion vectors/poor quality disparity values due to content being entirely present or entirely not present in a particular frame of a frame pair (i.e., a pair of images). A bi-directional ME/DFS search may be used to identify such occlusion regions. An occlusion may refer to a case where, due to object movement in the 2D image, other content within the 2D image is blocked from view (e.g., a moving object entering frame obscuring the background in the case of ME, or a stationary object shifting position and obscuring objects behind it due to stereo disparity in the case of DFS). The portion of the frame experiencing this effect may be referred to as an occlusion region. However, a bi-directional ME/DFS search may not address "holes" in the resulting values caused by discarding the occlusion regions, where the "holes" may be associated with corrupted motion vectors/corrupted disparity values. The "holes" may prevent a device from successfully performing ME/DFS.

Various technologies pertaining to mesh stitching for motion estimation and depth from stereo are described herein. A mesh may refer to a collection of vertices, edges, and faces that define a shape of a polyhedral object. The faces may include triangles (a triangle mesh), quadrilaterals (a quad mesh), or other polygons. In an example, an apparatus (e.g., a CPU) obtains an indication of a mesh associated with a set of motion vectors for a first frame and a second frame in a plurality of frames. The apparatus detects a set of regions in the mesh including a set of motion disparity values for the set of bidirectional motion vectors, where the delta of the set of motion disparity values crosses a coherency threshold. The apparatus calculates an adjustment to the mesh based on the region. The adjustment to the mesh may be an interpolation that is to be performed between at least two points of on the mesh. The apparatus outputs (e.g., to a graphics processor) an indication of the adjustment to the mesh based on the region. Vis-à-vis detecting the set of regions in the mesh and calculating the adjustment to the mesh, the apparatus may facilitate efficient interpolation of edge values in a mesh by a graphics processor. Furthermore, the above-described technologies may be added in-line to an extended reality (XR) pipeline without additional draw calls, and thus the above-described technologies may not incur additional overhead computational costs.

Motion estimation (ME) and depth from stereo (DFS) may refer to two image-based techniques to produce vectors/disparity values between a pair of images. Both ME and DFS may have to handle challenging content cases where occlusion or disocclusion may cause poor quality vectors/disparity values due to content being entirely present or not present in a particular frame of a frame pair (i.e., a pair of images). A frame may refer to an image buffer that is captured by a camera system, produced by a rendering system or decoded from a video system. A bi-directional ME/DFS search may be used to identify such occlusion regions. However, a bi-directional ME/DFS search may not address "holes" in the resulting values caused by discarding the occlusion regions. To address these issues, a bi-directional search and a hole-filling mesh stitching operation may be performed inline as part of existing extended reality (XR) draw calls. The mesh stitching operation may interpolate nearby valid ME/DFS results across gaps left in an output of the bi-directional search. For example, using GPU hardware (HW) interpolation, a mesh may be created by spanning a single primitive from edge to edge across a hole. By performing the bi-directional search and the hole-filling mesh stitching operation inline, additional draw calls may be avoided. The hole-filling pass may be integrated in two ways: (1) as part of TimeWarp, utilizing a warp mesh geometry pass which is already taking place or (2) during the final stage of ME/DFS, adding some vertex load, but without changing the TimeWarp implementation.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

A user may wear a display device in order to experienced extended reality (XR) content. XR may refer to a technology that blends aspects of a digital experience and the real world. XR may include augmented reality (AR), mixed reality (MR), and/or virtual reality (VR). In AR, AR objects may be superimposed on a real-world environment as perceived through the display device. In an example, AR content may be experienced through AR glasses that include a transparent or semi-transparent surface. An AR object may be projected onto the transparent or semi-transparent surface of the glasses as a user views an environment through the glasses. In general, the AR object may not be present in the real world and the user may not interact with the AR object. In MR. MR objects may be superimposed on a real-world environment as perceived through the display device and the user may interact with the MR objects. In some aspects, MR objects may include "video see through" (which may also be referred to as "visual see through") with virtual content added. In an example, the user may "touch" a MR object being displayed to the user (i.e., the user may place a hand at a location in the real world where the MR object appears to be located from the perspective of the user), and the MR object may "move" based on the MR object being touched (i.e., a location of the MR object on a display may change). In general, MR content may be experienced through MR glasses (similar to AR glasses) worn by the user or through a head mounted display (HMD) worn by the user. The HMD may include a camera and one or more display panels. The HMD may capture an image of environment as perceived through the camera and display the image of the environment to the user with MR objects overlaid thereon. Unlike the transparent or semi-transparent surface of the AR/MR glasses, the one or more display panels of the HMD may not be transparent or semi-transparent. In VR, a user may experience a fully-immersive digital environment in which the real-world is blocked out. VR content may be experienced through a HMD.

FIG. 1 is a block diagram that illustrates an example content generation system 100 configured to implement one or more techniques of this disclosure. The content generation system 100 includes a device 104. The device 104 may include one or more components or circuits for performing various functions described herein. In an example, the device may be an XR device, that is, the device may be configured to present XR content. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to inter-operate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic cir-cuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be inte-grated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal pro-cessors (DSPs), video processors, discrete logic, software, hardware, firmware, other equivalent integrated or discrete logic circuitry, or any combinations thereof. If the tech-niques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the fore-going, including hardware, software, a combination of hard-ware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be config-ured to receive information, e.g., eye or head position information, rendering commands, and/or location informa-tion, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the process-ing unit 120 may include a mesh stitcher 198 configured to obtain an indication of a mesh associated with a set of motion vectors for a first frame and a second frame in a plurality of frames; detect a set of regions in the mesh including a set of motion disparity values associated with the set of motion vectors, where each motion disparity value in the set of motion disparity values is less than a coherency threshold; calculate an adjustment to the mesh; and output an indication of the adjustment to the mesh. Although the following description may be focused on graphics processing, the concepts described herein may be applicable to other similar processing techniques. Furthermore, although the following description may be focused on ME and DFS, the techniques described herein may also be applicable to other techniques for finding corresponding points between two images or two video frames.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
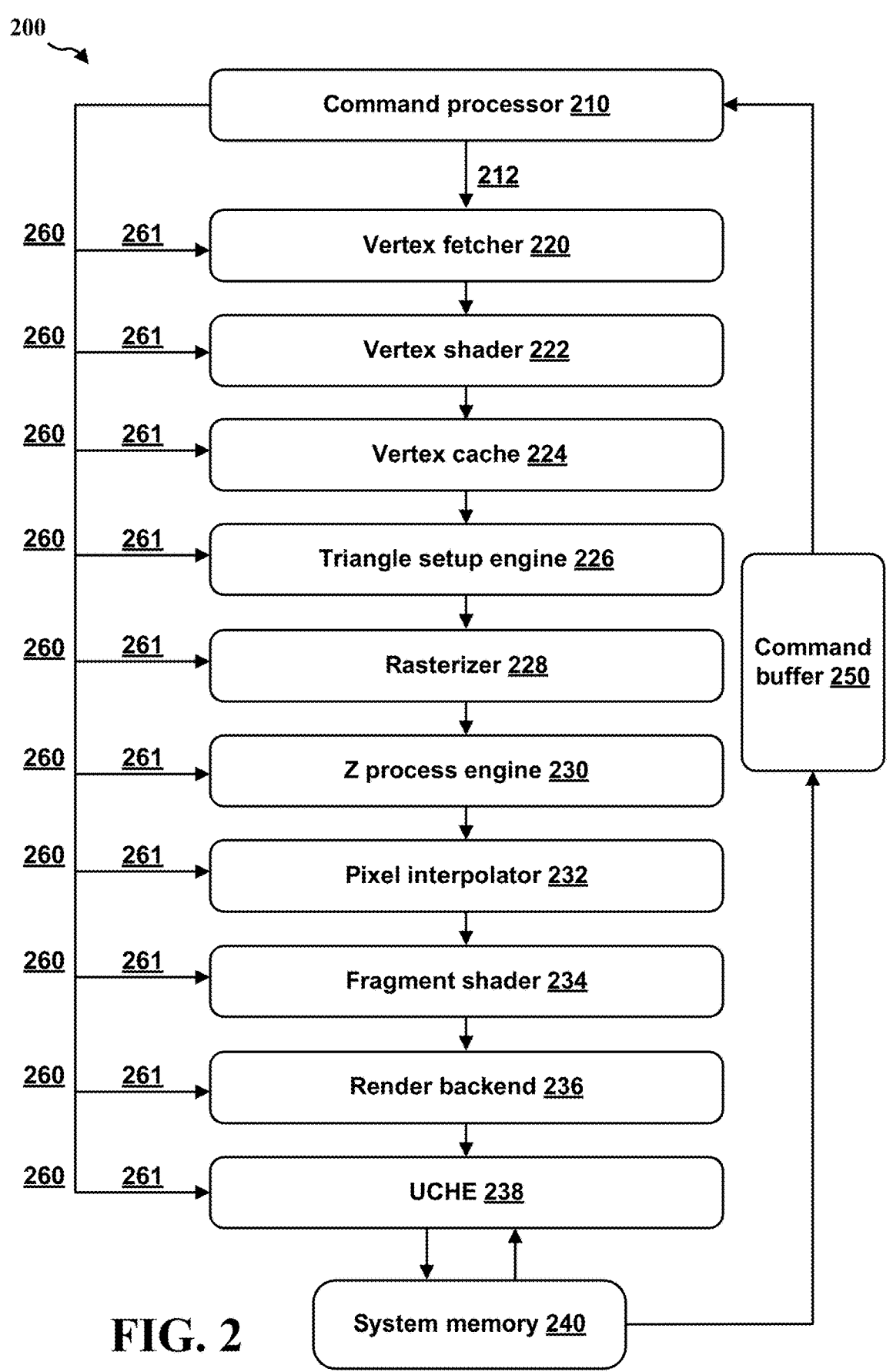
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass.

During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
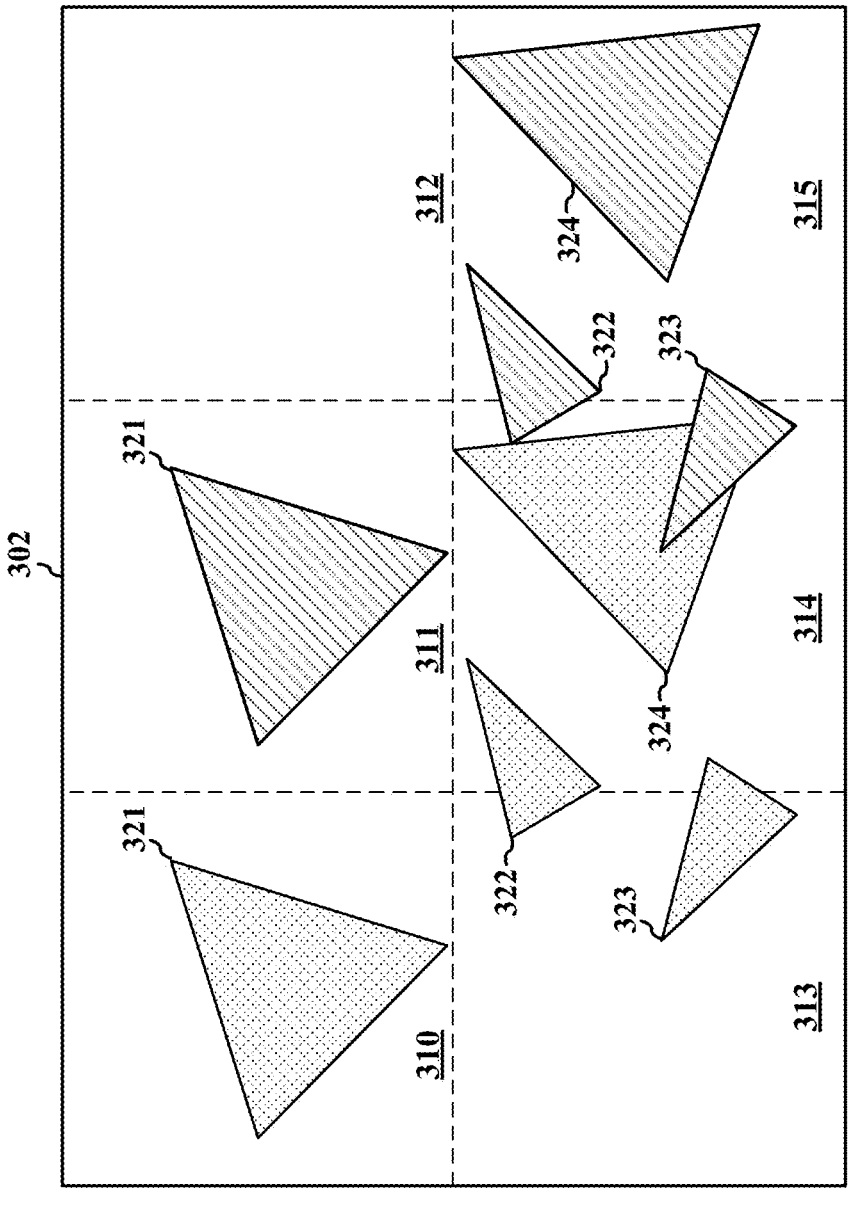
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multiview rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or consume more power compared to storing data at the frame buffer or system memory.

Figure 4:
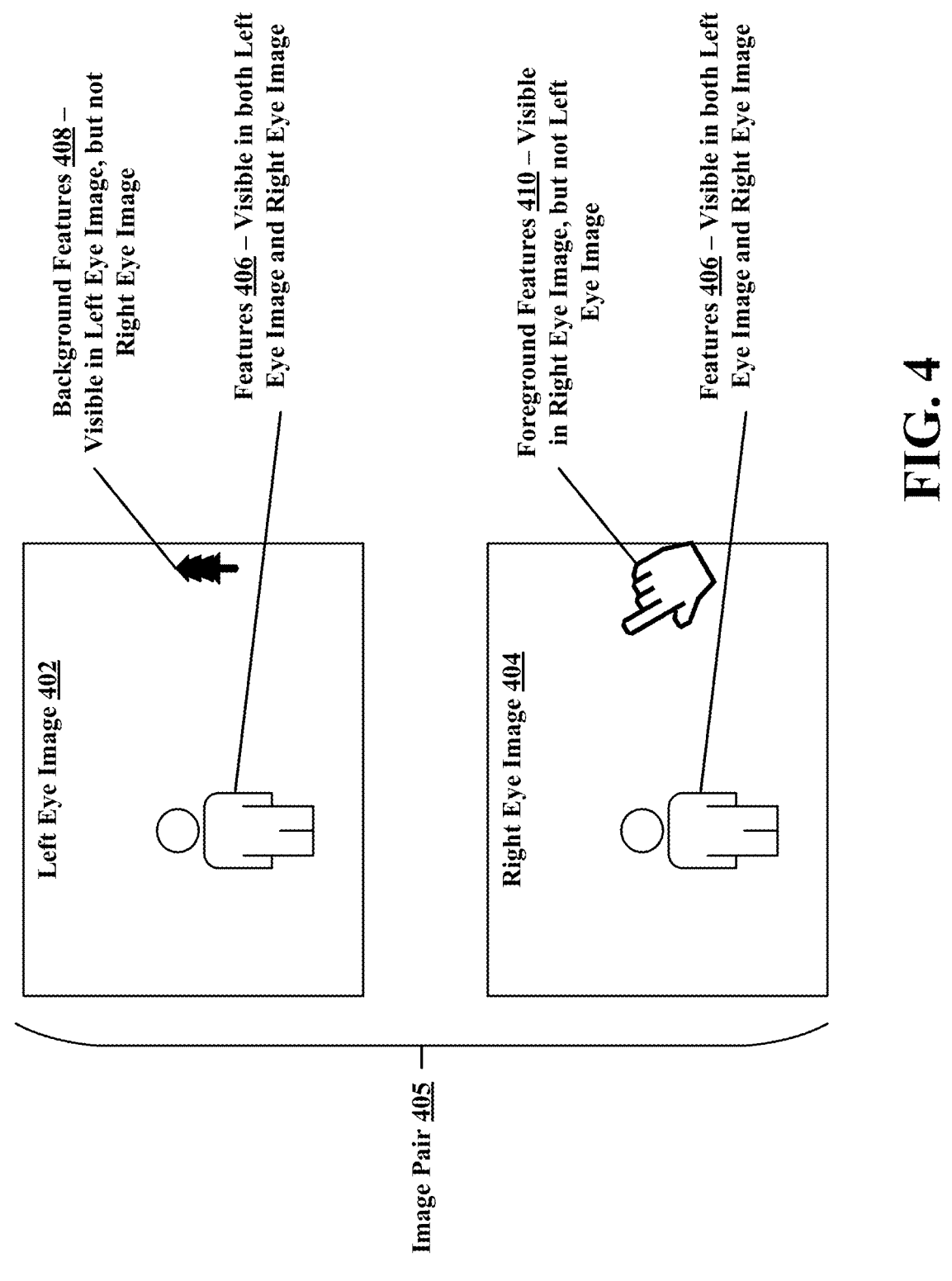
FIG. 4 is a diagram illustrating an example of a left eye image and a right eye image in accordance with one or more techniques of this disclosure.

FIG. 4 is a diagram 400 illustrating an example of a left eye image 402 and a right eye image 404 in accordance with one or more techniques of this disclosure. The left eye image 402 and the right eye image 404 may be an image pair 405 that may be presented concurrently (or nearly concurrently) on display panel(s), such as display panel(s) of an XR device (e.g., the device 104). In an example, the left eye image 402 may be presented on a first display panel of a device (e.g., an XR device) and the right eye image 404 may be presented on a second display panel of the device, where the left eye image 402 may be intended to be viewed by a left eye of a user of the XR device and where the right eye image 404 may be intended to be viewed by a left eye of the user of the XR device.

In an example, the left eye image 402 and the right eye image 404 may include features 406 (e.g., a person) that are visible in both the left eye image 402 and the right eye image 404. In an example, the left eye image 402 may include background features 408 (e.g., a tree) that are visible in the left eye image 402, but that are not visible in the right eye image 404. For instance, the background features 408 may not be visible in the right eye image 404 due to different camera angles associated with camera(s) of a device perceiving a scene (e.g., through a camera) corresponding to the left eye image 402 and the right eye image 404. Such a phenomena may be referred to as a stereo offset. Additionally, the background features 408 may not be visible in the right eye image 404 due to the background features 408 being located relatively close to a camera associated with the device. In another example, the right eye image 404 may include foreground features 410 (e.g., a hand) that are visible in the right eye image 404, but that are not visible in the left eye image 402.

Motion estimation (ME) and depth from stereo (DFS) may refer to two image-based techniques that produce motion vectors and disparity values, respectively, between a pair of images (e.g., the image pair 405). ME and DFS may be utilized in XR devices (e.g., the device 104). In an example, ME may be used to drive a space warp process (which may also be referred to as "SpaceWarp" or "space warp") and frame extrapolation in an XR device. In another example, DFS may be used to drive stereo-correct video see-through (VST) MR experiences.

In ME (which may also be referred to as an ME process), a device may determine motion vectors that describe a transformation of regions within a first two-dimensional (2D) image to corresponding locations within a second 2D image (e.g., the image pair 405). The first 2D image and the second 2D image may be adjacent frames in a video sequence. The motion vectors may correspond to a whole image or specific parts of an image (e.g., rectangular blocks, arbitrarily shaped patches, or pixels). The motion vectors may be represented by a translational model or another model that approximates motion of a real video camera.

In DFS (which may also be referred to as a DFS process), a device may determine disparity values between an image pair (e.g., the image pair 405), where the disparity values used in conjunction with parameters of an image buffer (e.g., a field of view) may be indicative of depths of content in the image pair. In DFS, the device may compute the disparity values by matching points between the image pair.

ME and DFS may encounter challenges in scenarios in which occlusion(s) or disocclusion(s) result in poor quality vectors/poor quality disparity values due to content being entirely present or entirely not present in a particular frame of a frame pair (e.g., an image pair 405). With more particularity, features that do not exist in both frames of the frame pair may result in corrupted motion vectors or corrupted disparity values, as a device performing ME/DFS may attempt to find the features in both frames, which is not possible due to the features not existing in both frames. The corrupted motion vectors may be manifested as motion vectors that include maximum or minimum values. The corrupted disparity values may be manifested as disparity values that are at a maximum value or a minimum value. In an example, a device performing ME/DFS on the image pair 405 may obtain corrupted motion vectors/corrupted disparity values due to the background features 408 being visible in the left eye image 402, but not in the right eye image 404. In another example, a device performing ME/DFS on the image pair 405 may obtain corrupted motion vectors/corrupted disparity values due to the foreground features 410 being visible in the right eye image 404, but not in the left eye image 402.

A device may perform a bi-directional search (e.g., a bi-directional search performed as part of ME (a "bi-directional ME search"), a bi-directional search performed as part of DFS (a "bi-directional DFS search")) in order to identify occlusion/disocclusion regions in an image pair. A bi-directional search may (1) attempt to match first points/features in a first image (e.g., the left eye image 402) to second points/features in a second image (e.g., the right eye image 404) and (2) attempt to match the second points/features in the second image to the first points/features in the first image. If the first points/features are unable to be matched to the second points/features or the second points/features are unable to be matched to the first points/features, occlusion/disocclusion regions associated with the first points/features or the second points/features may be discarded, which may leave "holes" in the first image and/or the second image. In image with a "hole" may not be suitable for presentation on a display panel and hence may impact a user experience. In an example, the occlusion/disocclusion regions may be associated with the background features 408 and/or the foreground features 410.

To address the issues described above pertaining to "holes," various aspects described herein relate to performing a bi-directional search and a hole-filling mesh stitching operation inline as part of a draw call (e.g., an existing XR draw call) to (1) identify occlusion/disocclusion regions and (2) interpolate nearby valid ME/DFS across gaps (i.e., holes) left in an output of the ME/DFS. By performing the bi-directional search and the hole-filling mesh stitching operation inline, a device may perform ME/DFS without additional draw calls, which may conserve computing resources and/or power resources of the device. In one aspect, a hole-filling pass (i.e., the hole-filling mesh stitching operation) may be performed as part of a time warp process (which may also be referred to as "TimeWarp") that utilizes a warp mesh geometry pass which has already occurred. A time warp process (also known as reprojection) may refer to a technique in XR that warps a rendered image based on latest available position information (i.e., head pose information) of an XR device before sending the rendered image to a display panel to correct for head movement of a user that occurred after the rendering occurred. Time warp may reduce latency and increase or maintain a frame rate. Furthermore, time warp may reduce judder. In another aspect, the hole-filling pass (i.e., the hole-filling mesh stitching operation) may be performed in a final stage of ME/DFS, which may add some additional vertex load, but which may not involve changes to an implementation of time warp. Furthermore, performing the bi-directional search and the hole-filling mesh stitching operation inline may be performed in gaming use cases by integrating the bi-directional search and the hole-filling mesh stitching operation with a frame extrapolation mesh.

FIG. 5 is a diagram 500 illustrating an example of a left eye image 502, a right eye image 504, and a disparity map 506 in accordance with one or more techniques of this disclosure. The left eye image 502 may include an obstructed region 508 that is not present in the right eye image 504. In an example, the obstructed region 508 may be present in the left eye image 502 due to an issue with a camera corresponding to the left eye image 502. The disparity map 506 may show an apparent pixel difference or motion between the left eye image 502 and the right eye image 504. Features in the disparity map 506 that are relatively close to cameras that captured the left eye image 502 and the right eye image 504 may be represented as relatively "lighter" colors in the disparity map 506 and features in the disparity map 506 that are relatively far away from the cameras that captured the left eye image 502 and the right eye image 504 may be represented as relatively "darker" colors in the disparity map 506. With more particularity, pixels in the disparity map 506 may represent disparity values, where each disparity value may be indicative of a distance (or motion) from the cameras. The disparity map 506 may be generated/obtained by performing a DFS process. The disparity map 506 may include a corrupted region 510 due to the obstructed region 508 that is present in the left eye image 502. In an example, the corrupted region 510 may include maximum disparity values (black) and minimum disparity values (white).

Figure 6:
FIG. 6 is a diagram illustrating an example of performing depth from stereo (DFS) with expansion filtering and mesh stitching in accordance with one or more techniques of this disclosure.
Figure 7:
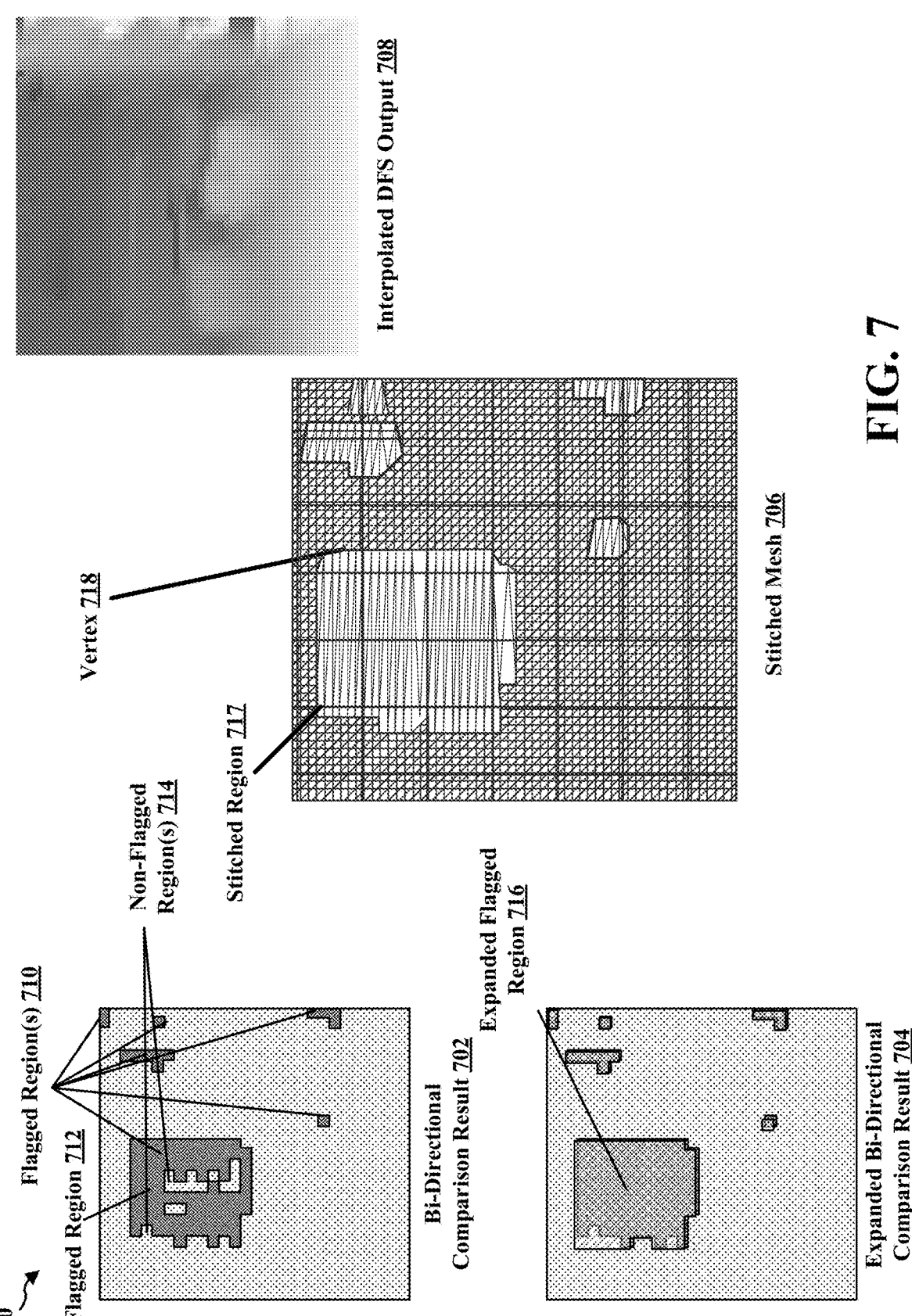
FIG. 7 is a diagram illustrating an example of a bi-directional comparison result, an expanded bi-directional comparison result, a stitched mesh, and an interpolated DFS output in accordance with one or more techniques of this disclosure.

FIG. 6 is a diagram 600 illustrating an example of performing DFS (i.e., "performing a DFS process") with expansion filtering and mesh stitching in accordance with one or more techniques of this disclosure. In an example, and as will be explained in greater detail below, performing DFS with expansion filtering and mesh stitching may avoid or mitigate presence of the corrupted region 510 in the disparity map 506. FIG. 7 is a diagram 700 illustrating an example of a bi-directional comparison result 702, an expanded bi-directional comparison result 704, a stitched mesh 706, and an interpolated DFS output 708 in accordance with one or more techniques of this disclosure.

Referring jointly now to FIGS. 6 and 7, a device (e.g., the device 104) may perform a left-right (L-R) DFS 602 on an image pair (e.g., on the left eye image 502 and the right eye image 504), that is, the device may attempt to match features/points in the left eye image 502 to features/points in the right eye image 504. The device may also perform a right-left (R-L) DFS 604 on the image pair, that is, the device may attempt to match the (previously matched) features/points in the right eye image 504 with corresponding features/points in the left eye image 502.

The device may perform a bi-directional comparison 606 based on the L-R DFS 602 and the R-L DFS 604 in order to generate a bi-directional comparison result 702. The bi-directional comparison result 702 may include flagged region(s) 710 (indicated by dark grey coloring in FIG. 7). The flagged region(s) 710 may be associated with the obstructed regions in the left eye image 502 or the right eye image 504. In an example, the flagged region(s) 710 may include a flagged region 712 corresponding to the obstructed region 508. The device may determine the flagged region(s) 710 based on a comparison of disparity values obtained from the L-R DFS 602 and the R-L DFS 604 to a disparity threshold. In an example, the device may mark region(s) as the flagged region(s) when disparity value(s) associated with the region(s) are greater than the disparity threshold. In an example, disparity values associated with the flagged region(s) 710 may be poor quality disparity values. Stated differently, the flagged region(s) 710 may be associated with points that are cannot be matched between the left eye image 502 and the right eye image 504. The flagged region(s) 710 may correspond to "holes" as described above.

As illustrated in FIG. 7, the flagged region 712 may be non-contiguous, that is, the flagged region 712 may include non-flagged region(s) 714 (indicated in FIG. 7 as light grey coloring within the flagged region 712). In order to avoid interpolating between poor quality disparity values within the flagged region 712, the device may perform expansion filtering 608 on the bi-directional comparison result 702 to obtain the expanded bi-directional comparison result 704. As depicted in FIG. 7, the expanded bi-directional comparison result 704 may not include the non-flagged region(s) 714. In an example, the device may (1) identify the non-flagged region(s) 714 within the flagged region 712 and (2) determine that the non-flagged region(s) are encompassed (e.g., bordered entirely by) the flagged region 712. The device may adjust motion disparity values of the non-flagged region(s) 714 within the flagged region 712 to be less than the disparity threshold to generate the expanded bi-directional comparison result 704, where the expanded bi-directional comparison result 704 may include an expanded flagged region 716. Motion disparity values may include motion values (i.e., motion vectors) or disparity values. The device may also adjust motion disparity values of regions bordering the outside of the flagged region 712 to be less than the disparity threshold as part of the expansion filtering 608.

The device 104 may perform mesh stitching 610 (i.e., a vertex, geometry, or tessellation shading stage of a mesh pass) based on the expanded bi-directional comparison result 704 to generate a stitched mesh 706, where the stitched mesh 706 may include a stitched region 717 corresponding to the expanded flagged region 716. For instance, a CPU of the device 104 may transmit the expanded bi-directional comparison result 704 to a graphics processor (e.g., a GPU) of the device, and the graphics processor may perform the mesh stitching. Performing the mesh stitching may involve interpolating between a first valid point that borders the expanded flagged region 716 and a second valid point that borders the expanded flagged region 716. In an example, the first valid point and the second valid point may be horizontal to one another, that is, a horizontal line may be drawn between the first valid point and the second valid point. A mesh may refer to a collection of vertices, edges, and faces that define a shape of a polyhedral object. The faces may include triangles (a triangle mesh), quadrilaterals (a quad mesh), or other polygons. In an example, the device may stretch a vertex 718 of a triangle horizontally across the expanded flagged region 716 of the expanded bi-directional comparison result 704 in order to create a "watertight" (i.e., a mesh with no holes) mesh which has invalid hole regions spanned by a single primitive from one edge of the expanded flagged region 716 to another edge of the expanded flagged region 716. The device may utilize GPU hardware interpolation during a mesh render to blend valid DFS results (or ME results) across the invalid region (i.e., across the expanded flagged region 716). The device may discard mesh primitives (e.g., triangles) that were included entirely within the expanded flagged region 716. In one aspect, the mesh stitching 610 may be performed inline with a rendering process. In one example, the mesh stitching 610 may be integrated with time warp (explained in greater detail below), that is, the mesh stitching may be combined with existing warp mesh operations. In another example, the mesh stitching 610 may be performed as a standalone process, that is, a mesh may be utilized for a final normalization pass and a device may perform stitching and interpolation based on the final normalization pass.

The device may perform rendering operation(s) based on the stitched mesh 706 to obtain the interpolated DFS output 708. The interpolated DFS output 708 may be similar to the disparity map 506; however, as illustrated in FIG. 7, the interpolated DFS output 708 may not include the corrupted region 510 due to performance of the bi-directional comparison 606, the expansion filtering 608, and the mesh stitching 610.

The processes described above may provide for efficient interpolation of valid edge values (e.g., valid motion vectors, valid disparity values) across a discarded region (e.g., the expanded flagged region 716) using GPU hardware interpolation. The processes described above may be efficient in use cases that already utilize a mesh for rendering. Furthermore, the processes described above may provide for a water tight mesh, may span a discarded region (e.g., the expanded flagged region 716) with a single primitive, and may help facilitate vertical (verts) forming spanning geometry that lands on valid edge values (e.g., valid motion vectors, valid disparity values).

Although the bi-directional comparison 606, the expansion filtering 608, and the mesh stitching 610 have been described above as being operated on DFS output(s), other possibilities are contemplated. In an example, the device may perform ME 605 on an image pair. The device may perform the bi-directional comparison 606, the expansion filtering 608, and the mesh stitching 610 based on an output (e.g., motion vectors) of the ME 605.

Figure 8:
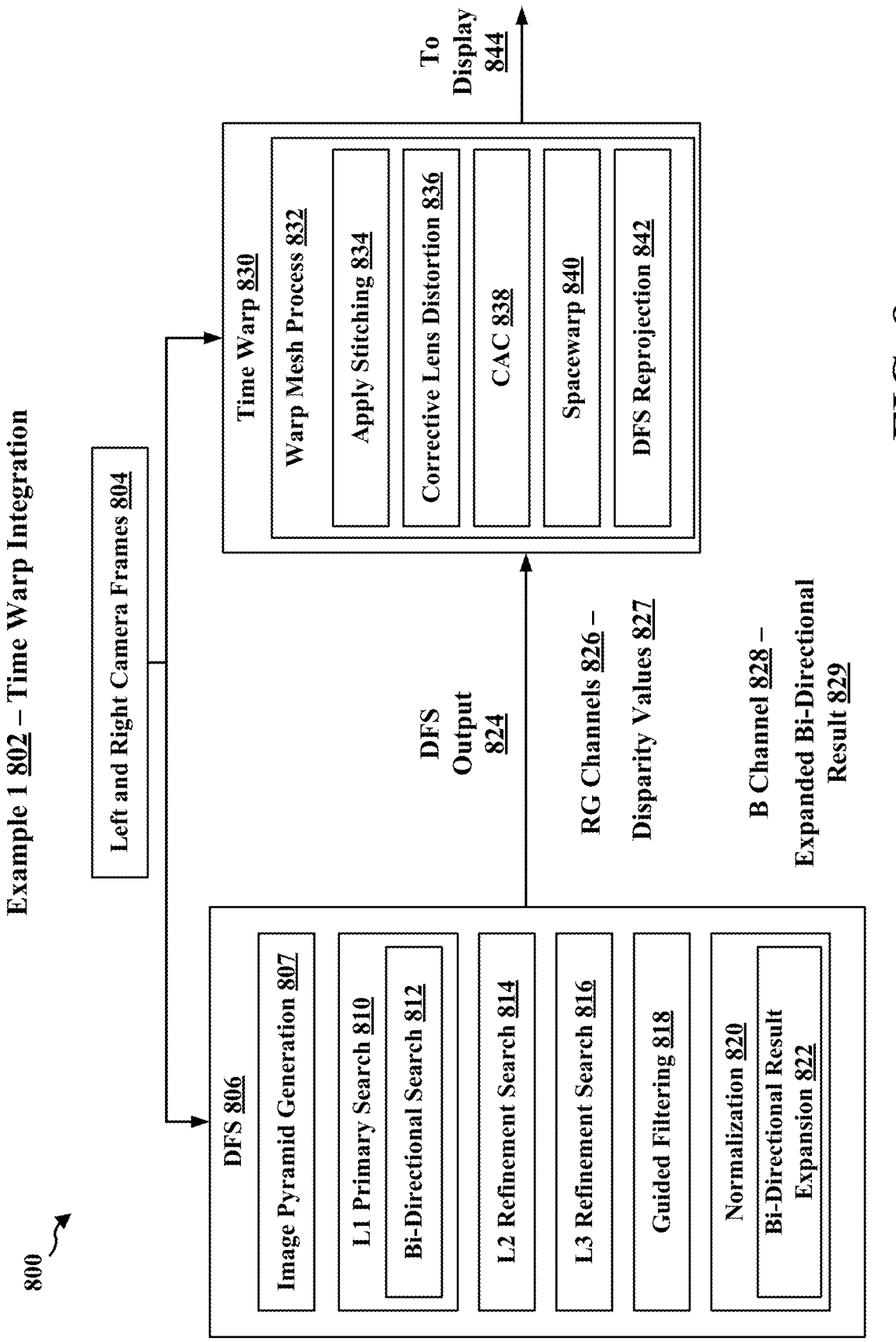
FIG. 8 is a diagram illustrating a first example of integrating mesh stitching with time warp in accordance with one or more techniques of this disclosure.

FIG. 8 is a diagram 800 illustrating a first example 802 of integrating mesh stitching with time warp in accordance with one or more techniques of this disclosure. A device (e.g., the device 104) may obtain left and right camera frames 804 from a left camera and a right camera of the device. In an example, the left and right camera frames 804 may include the left eye image 402 and the right eye image 404. In another example, the left and right camera frames 804 may include the left eye image 502 and the right eye image 504.

The device may perform a DFS 806 on the left and right camera frames 804. During the DFS 806, the device may perform an image pyramid generation 807 to generate a pyramid of images for the left and right camera frames 804. The pyramid of images may include downscaled versions of the left and right camera frames 804. In an example, the pyramid of images may include a level 0 (L0) left image frame, a L0 right image frame, a level 1 (L1) left image frame, an L1 right image frame, a level 2 (L2) left image frame, an L2 right image frame, a level 3 (L3) left image frame, and an L3 right image frame. The L0 left image frame and the L0 right image frame may have a lesser resolution than a resolution of the L1 left image frame and the L1 right image frame. The L1 left image frame and the L1 right image frame may have a lesser resolution than a resolution of the L2 left image frame and the L2 right image frame. The L2 left image frame and the L2 right image frame may have a lesser resolution than a resolution of the L3 left image frame and the L3 right image frame.

During the DFS 806, the device may perform an L1 primary search 810 on the pyramid of images. During the L1 primary search 810, the device may search for corresponding features in L1 of the pyramid of images. As part of the L1 primary search 810, the device may perform a bi-directional search 812. The bi-directional search 812 may be or include the bi-directional comparison 606 described above. The bi-directional search 812 may generate the bi-directional comparison result 702. During the DFS 806, the device may perform an L2 refinement search 814 on the pyramid of images. During the L2 refinement search 814, the device may search corresponding features in L2 of the pyramid of images based on results of the L1 primary search 810. During the DFS 806, the device may perform an L3 refinement search 816 on the pyramid of images. During the L3 refinement search 816, the device may search corresponding features in L3 of the pyramid of images based on results of the L2 refinement search 814. During the DFS 806, the device may perform guided filtering 818 on results of the L3 refinement search 816. Guided filtering may be an edge-preserving data smoothing technique which uses a guide buffer from which edges to be preserved are determined. The guide buffer may be an original source buffer being filtered. During the DFS 806, the device may perform a normalization 820 based on results of the guided filtering

818. During the normalization 820, the device may perform a bi-directional result expansion 822. The bi-directional result expansion 822 may be or include the expansion filtering 608. The bi-directional result expansion 822 may generate the expanded bi-directional comparison result 704. The DFS 806 may produce a DFS output 824. The DFS output 824 may be carried in red (R) green (G) (RG) channels 826 and a blue (B) channel 828. The RG channels 826 may include disparity values 827. The B channel 828 may include an expanded bi-directional result 829 (e.g., the expanded bi-directional comparison result 704).

The device may perform a time warp 830 based on the DFS output 824 and the left and right camera frames 904. The time warp 830 may include a warp mesh process 832. The warp mesh process 832 may include applying stitching 834 to the DFS output 824. Applying the stitching 834 may be or include the mesh stitching 610. Applying the stitching 834 may generate the stitched mesh 706. The warp mesh process 832 may include applying a corrective lens distortion 836 (in order to counteract opposite lens distortions which may be be introduced later by optical elements of an XR device) based on an output of the stitching 834. The warp mesh process 832 may include performing chromatic aberration correction (CAC) 838 based on an output of the corrective lens distortion 836. Chromatic aberration (CA) may refer to a failure of a lens to focus all colors to a same point. CA may be caused by dispersion. CA may be manifested as fringes of color along boundaries that separate dark and bright parts of an image. CAC 838 may remove/mitigate the fringes of color. The warp mesh process 832 may include performing a spacewarp 840 on an output of the CAC 838. Space warp may refer to synthesizing frames (e.g., every second frame) by extrapolating motion of past frames. The warp mesh process 832 may include performing a DFS reprojection 842 based on an output of the spacewarp 840. The DFS reprojection 842 may include performing adjustments to a rendered frame based on latest available pose information of the device (e.g., pose information of an XR device). An output of the time warp 830 (i.e., a rendered frame) may be output for display 844 on a display panel.

Figure 9:
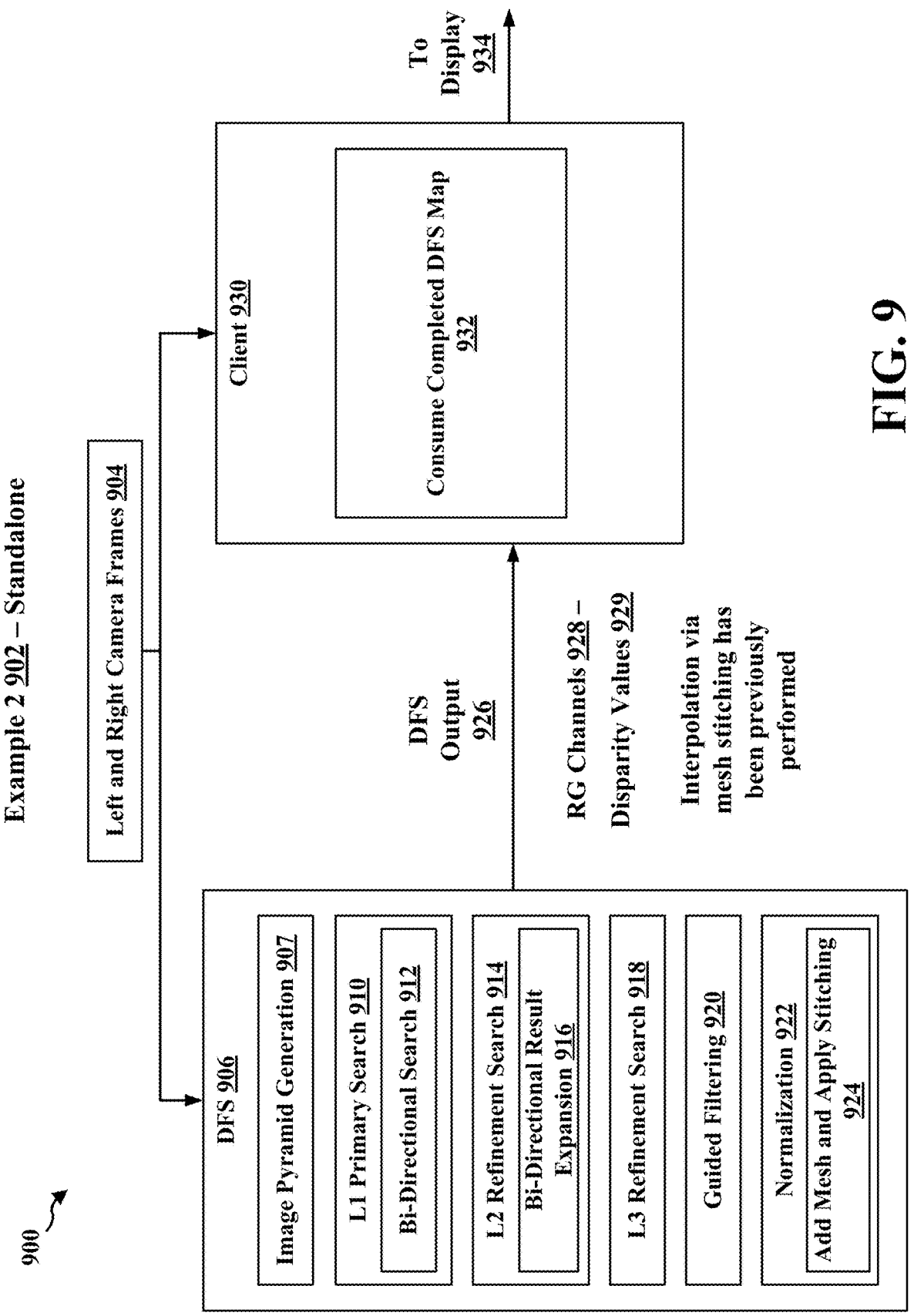
FIG. 9 is a diagram illustrating a second example of standalone mesh stitching in accordance with one or more techniques of this disclosure.

FIG. 9 is a diagram 900 illustrating a second example 902 of standalone mesh stitching in accordance with one or more techniques of this disclosure. A device (e.g., the device 104) may obtain left and right camera frames 904 from a left camera and a right camera of the device. In an example, the left and right camera frames 904 may include the left eye image 402 and the right eye image 404. In another example, the left and right camera frames 904 may include the left eye image 502 and the right eye image 504.

The device may perform a DFS 906 on the left and right camera frames 904. During the DFS 906, the device may perform an image pyramid generation 907 to generate a pyramid of images for the left and right camera frames 904. The pyramid of images may include downscaled versions of the left and right camera frames 904. In an example, the pyramid of images may include a level 0 (L0) left image frame, an L0 right image frame, a level 1 (L1) left image frame, an L1 right image frame, a level 2 (L2) left image frame, a level 3 (L3) left image frame, and a L3 right image frame. The L0 left image frame and the L0 right image frame may have a lesser resolution than a resolution of the L1 left image frame and the L1 right image frame. The L1 left image frame and the L1 right image frame may have a lesser resolution than a resolution of the L2 left image frame and the L2 right image frame. The L2 left image frame and the L2 right image frame may have a lesser resolution than a resolution of the L3 left image frame and the L3 right image frame.

During the DFS 906, the device may perform an L1 primary search 910 on the pyramid of images During the L1 primary search 910, the device may search for corresponding features in L1 of the pyramid of images. As part of the L1 primary search 910, the device may perform a bi-directional search 912. The bi-directional search 912 may be or include the bi-directional comparison 606 described above. The bi-directional search 912 may generate the bi-directional comparison result 702. During the DFS 906, the device may perform an L2 refinement search 914 on the pyramid of images. During the L2 refinement search 914, the device may search corresponding features in L2 of the pyramid of images based on results of the L1 primary search 910. As part of the L2 refinement search 914, the device may perform a bi-directional result expansion 916. The bi-directional result expansion 916 may be or include the expansion filtering 608. The bi-directional result expansion 916 may generate the expanded bi-directional comparison result 704. During the DFS 906, the device may perform an L3 refinement search 918 on the pyramid of images. During the L3 refinement search 918, the device may search corresponding features in L3 of the pyramid of images based on results of the L2 refinement search 914. During the DFS 906, the device may perform guided filtering 920 on results of the L3 refinement search 918. During the DFS 906, the device may perform a normalization 922 based on results of the guided filtering 920. During the normalization 922, the device may add a mesh and apply stitching 924. Applying the stitching 924 may be or include the mesh stitching 610. Applying the stitching 924 may generate the stitched mesh 706. Furthermore, applying the stitching 924 may interpolate valid edge values across an invalid region (e.g., the flagged region 712). The DFS 906 may produce a DFS output 926. The DFS output 926 may be carried in RG channels 928. The RG channels 928 may include disparity values 929.

A client 930 may obtain the DFS output 926 and the left and right camera frames 904. At 932, the client 930 may consume the completed DFS map (i.e., the client 930 may consume the DFS output 926). At 934, the client 930 may transmit an indication of the consumed, completed DFS map to a display panel. In an example, the client may be a time warp implementation or an application or a system component that utilizes DFS, such as 3D reconstruction. The consumed, completed DFS map (i.e., a fully populated DFS buffer with no holes) may be used in a further graphical pipeline associated with the client 930.

Figure 10:
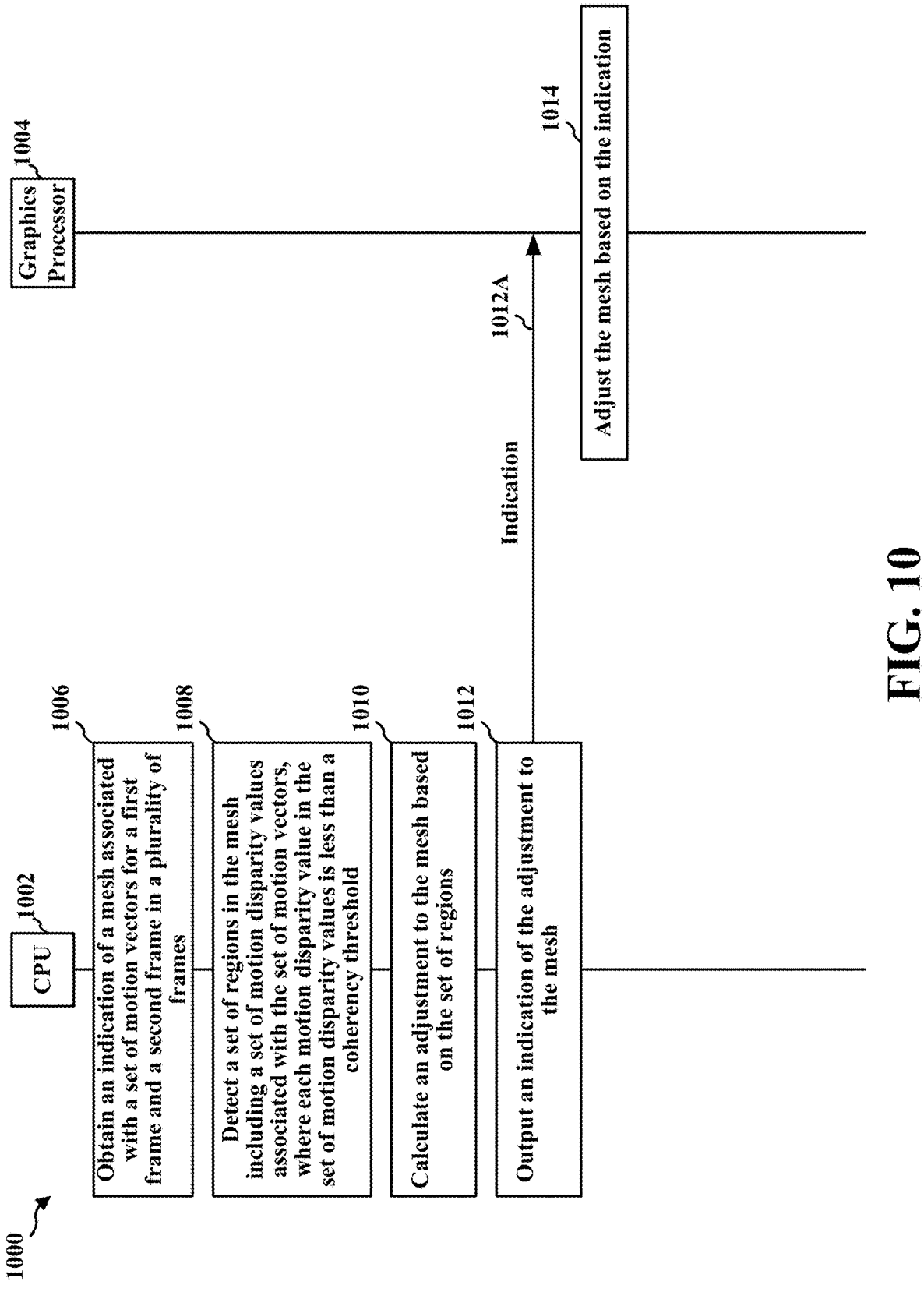
FIG. 10 is a call flow diagram illustrating example communications between a CPU and a graphics processor in accordance with one or more techniques of this disclosure.

FIG. 10 is a call flow diagram 1000 illustrating example communications between a CPU 1002 and a graphics processor 1004 in accordance with one or more techniques of this disclosure. In an example, the CPU 1002 and the graphics processor 1004 may be included in the device 104. In another example, the CPU 1002 and the graphics processor 1004 may be included in difference devices.

At 1006, the CPU 1002 may obtain an indication of a mesh associated with a set of motion vectors for a first frame and a second frame in a plurality of frames. At 1008, the CPU 1002 may detect a set of regions in the mesh including a set of motion disparity values associated with the set of motion vectors, where each motion disparity value in the set of motion disparity values may be less than a coherency threshold. At 1010, the CPU 1002 may calculate an adjustment to the mesh based on the region. At 1012, the CPU 1002 may output an indication of the adjustment to the mesh based on the region. For instance, at 1012A, the CPU 1002 may transmit, to the graphics processor 1004, the indication of the adjustment to the mesh based on the region. At 1014, the graphics processor 1004 may adjust the mesh based on the indication of the adjustment to the mesh. For instance, as described above, the graphics processor 1004 may stitch and interpolate the mesh based on the indication.

FIG. 11 is a flowchart 1100 of an example method of graphics processing in accordance with one or more techniques of this disclosure. The method may be performed by an apparatus, such as an apparatus for graphics processing, a GPU, a CPU, GPU driver software executed at a CPU, a wireless communication device, the device 104, and the like, as used in connection with the aspects of FIGS. 1-10. The method may be associated with various advantages, such as improving ME and DFS by handling occlusions/disocclusions in a pair of images. In an example, the method may be performed by the mesh stitcher 198.

At 1102, the apparatus (e.g., a CPU) obtains an indication of a mesh associated with a set of motion vectors for a first frame and a second frame in a plurality of frames. For example, FIG. 10 at 1006 shows that the CPU 1002 may obtain an indication of a mesh associated with a set of motion vectors for a first frame and a second frame in a plurality of frames. In an example, the mesh may correspond to a version of the stitched mesh 706 prior to the stitched mesh 706 being stitched. In an example, the first frame and the second frame may be the left eye image 402 and the right eye image 404, respectively. In another example, the first frame and the second frame may be the left eye image 502 and the right eye image 504, respectively. In an example, the set of motion vectors may be associated with the L-R DFS 602 and the R-L DFS 604. In another example, the set of motion vectors may be associated with the ME 605. In an example, 1102 may be performed by the mesh stitcher 198.

At 1104, the apparatus (e.g., a CPU) detects a set of regions in the mesh including a set of motion disparity values associated with the set of motion vectors, where each motion disparity value in the set of motion disparity values is less than a coherency threshold. For example, FIG. 10 at 1008 shows that the CPU 1002 may detect a set of regions in the mesh including a set of motion disparity values associated with the set of motion vectors, where each motion disparity value in the set of motion disparity values is less than a coherency threshold. In an example, the set of regions may be or include the flagged region(s) 710. In an example, the set of motion disparity values may be associated with the L-R DFS 602 and the R-L DFS 604. In another example, the set of motion vectors may be associated with the ME 605. In an example, the coherency threshold may be an angular alignment of motion disparity values calculated by $\cos^{-1}(V_f\text{-}V_b/(|V_f|\text{-}V_b))*(180/\pi)<5.0$, where $V_f$ may a forward motion disparity value (i.e., a first motion disparity value used for a first search in a first direction in a bidirectional search) and $V_b$ may be a backward motion disparity value (i.e., a second motion disparity value used for a second search in a second direction in the bidirectional search). In another example, the coherency threshold may be calculated as $\|P_f\text{-}P_b\|<1.0$ texel in a resolution associated with the L1 primary search 810, where $P_f$ may be a start point of a forward motion disparity value and $P_b$ may be an end point of a corresponding backward motion disparity value within the bidirectional search. In an example, the motion disparity values may be or include the disparity values 827. In an example, calculating the adjustment to the mesh may include aspects described above in connection with FIGS. 6 and 7. In an example, 1104 may be performed by the mesh stitcher 198.

At 1106, the apparatus (e.g., a CPU) calculates an adjustment to the mesh based on the region. For example, FIG. 10 at 1010 shows that the CPU 1002 may calculate an adjustment to the mesh based on the region. In an example, calculating the adjustment to the mesh may include aspects described above in connection with FIGS. 6 and 7. In an example, 1106 may be performed by the mesh stitcher 198.

At 1108, the apparatus (e.g., a CPU) outputs an indication of the adjustment to the mesh based on the region. For example, FIG. 10 at 1012 shows that the CPU 1002 may output an indication of the adjustment to the mesh based on the region. In an example, outputting the indication of the adjustment to the mesh may include outputting the DFS output 824 or the DFS output 926. In an example, the indication of the adjustment to the mesh may be visually illustrated in the stitched mesh 706 (e.g., as the stitched region 717). In an example, 1108 may be performed by the mesh stitcher 198.

Figure 12:
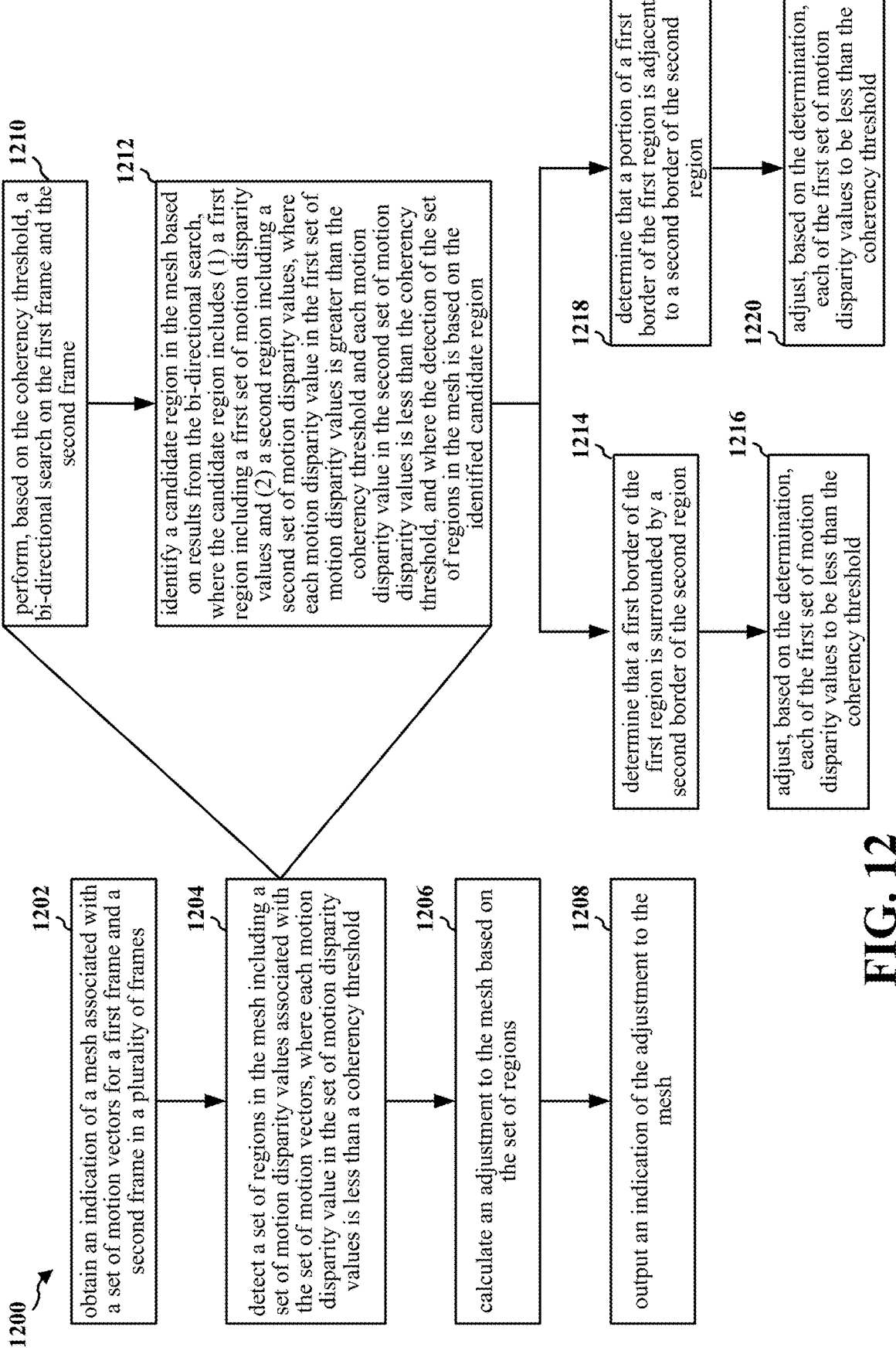
FIG. 12 is a flowchart of an example method of graphics processing in accordance with one or more techniques of this disclosure.

FIG. 12 is a flowchart 1200 of an example method of graphics processing in accordance with one or more techniques of this disclosure. The method may be performed by an apparatus, such as an apparatus for graphics processing, a GPU, a CPU, GPU driver software executed at a CPU, a wireless communication device, the device 104, and the like, as used in connection with the aspects of FIGS. 1-10. The method may be associated with various advantages, such as improving ME and DFS by handling occlusions/disocclusions in a pair of images. In an example, the method (including the various aspects detailed below) may be performed by the mesh stitcher 198.

At 1202, the apparatus (e.g., a CPU) obtains an indication of a mesh associated with a set of motion vectors for a first frame and a second frame in a plurality of frames. For example, FIG. 10 at 1006 shows that the CPU 1002 may obtain an indication of a mesh associated with a set of motion vectors for a first frame and a second frame in a plurality of frames. In an example, the mesh may correspond to a version of the stitched mesh 706 prior to the stitched mesh 706 being stitched. In an example, the first frame and the second frame may be the left eye image 402 and the right eye image 404, respectively. In another example, the first frame and the second frame may be the left eye image 502 and the right eye image 504, respectively. In an example, the set of motion vectors may be associated with the L-R DFS 602 and the R-L DFS 604. In another example, the set of motion vectors may be associated with the ME 605. In an example, 1202 may be performed by the mesh stitcher 198.

At 1204, the apparatus (e.g., a CPU) detects a set of regions in the mesh including a set of motion disparity values associated with the set of motion vectors, where each motion disparity value in the set of motion disparity values is less than a coherency threshold. For example, FIG. 10 at 1008 shows that the CPU 1002 may detect a set of regions in the mesh including a set of motion disparity values associated with the set of motion vectors, where each motion disparity value in the set of motion disparity values is less than a coherency threshold. In an example, the set of region may be or include the flagged region(s) 710. In an example, the set of motion disparity values may be associated with the L-R DFS 602 and the R-L DFS 604. In another example, the set of motion vectors may be associated with the ME 605. In an example, the coherency threshold may be the angular alignment of the motion disparity values calculated by $\cos^{-1}((V_f - V_b)/(|V_f| - |V_b|))*(180/\pi) < 5.0$, where $V_f$ may be the forward motion disparity value and $V_b$ may be the backward motion disparity value within the bidirectional search. In another example, the coherency threshold may be calculated as $\|P_f - P_b\| < 1.0$ texel in a resolution associated with the L1 primary search 810, where $P_f$ may be the start point of a forward motion disparity value and $P_b$ may be the end point of the corresponding backward motion disparity value within the bidirectional search. In an example, the motion disparity values may be or include the disparity values 827. In an example, calculating the adjustment to the mesh may include aspects described above in connection with FIGS. 6 and 7. In an example, 1204 may be performed by the mesh stitcher 198.

At 1206, the apparatus (e.g., a CPU) calculates an adjustment to the mesh based on the region. For example, FIG. 10 at 1010 shows that the CPU 1002 may calculate an adjustment to the mesh based on the region. In an example, calculating the adjustment to the mesh may include aspects described above in connection with FIGS. 6 and 7. In an example, 1206 may be performed by the mesh stitcher 198.

At 1208, the apparatus (e.g., a CPU) outputs an indication of the adjustment to the mesh based on the region. For example, FIG. 10 at 1012 shows that the CPU 1002 may output an indication of the adjustment to the mesh based on the region. In an example, outputting the indication of the adjustment to the mesh may include outputting the DFS output 824 or the DFS output 926. In an example, the indication of the adjustment to the mesh may be visually illustrated in the stitched mesh 706 (e.g., as the stitched region 717). In an example, 1208 may be performed by the mesh stitcher 198.

In one aspect, the set of motion disparity values may include at least one of: a set of motion values associated with a set of vectors for a map of a motion difference between the first frame and the second frame; or a set of disparity values associated with a stereo offset between a left-eye image and a right-eye image, where the left-eye image and the right-eye image may be associated with one or more frames of the plurality of frames. For example, the set of motion values associated with a set of vectors for a map of a motion difference between the first frame and the second frame may be associated with the ME 605 and the set of disparity values may be associated with the L-R DFS 602 and the R-L DFS 604.

In one aspect, calculating the adjustment to the mesh may include calculating the adjustment to the mesh during a time warp process associated with an extended reality (XR) device. For example, the aforementioned aspect may correspond to the first example 802 in FIG. 8.

In one aspect, calculating the adjustment to the mesh may include calculating the adjustment to the mesh during at least one of a depth from stereo (DFS) process or a motion estimation process. For example, the DFS process may correspond to the L-R DFS 602 and the R-L DFS 604 and the motion estimation process may correspond to the ME 605.

In one aspect, outputting the indication of the adjustment to the mesh may include transmitting, to a graphics processor, the indication of the adjustment to the mesh. For example, FIG. 10 at 1012A shows that outputting the indication of the adjustment to the mesh may include transmitting, to the graphics processor 1004, the indication of the adjustment to the mesh.

In one aspect, outputting the indication of the adjustment to the mesh may include storing, in at least one of a memory, a buffer, or a cache, the indication of the adjustment to the mesh. For example, outputting the indication of the adjustment to the mesh at 1012 may include outputting the indication of the adjustment to the mesh may include storing, in at least one of a memory, a buffer, or a cache, the indication of the adjustment to the mesh. In an example, the memory, the buffer, or the cache may be included in the internal memory 121.

In one aspect, the set of regions in the mesh may be associated with an occlusion in one of the first frame or the second frame, and where the adjustment to the mesh may be associated with a removal or a mitigation of the occlusion in one of the first frame or the second frame. For example, the occlusion may be associated with the obstructed region 508. In another example, the occlusion may be associated with the foreground features 410. Furthermore, a comparison of the interpolated DFS output 708 to the disparity map 506 shows that the adjustment to the mesh may be associated with a removal or a mitigation of the occlusion in one of the first frame or the second frame.

In one aspect, at 1210, detecting the set of regions in the mesh may include: performing, based on the coherency threshold, a bi-directional search on the first frame and the second frame. For example, the bi-directional search may be or include the bi-directional comparison 606. In another example, the bi-directional search may be the bi-directional search 812 or the bi-directional search 912. In an example, 1210 may be performed by the mesh stitcher 198.

In one aspect, at 1212, detecting the set of regions in the mesh may include: identifying a candidate region in the mesh based on results from the bi-directional search, where the candidate region may include (1) a first region including a first set of motion disparity values and (2) a second region including a second set of motion disparity values, where each motion disparity value in the first set of motion disparity values is greater than the coherency threshold and each motion disparity value in the second set of motion disparity values is less than the coherency threshold, and where the detection of the set of regions in the mesh may be based on the identified candidate region. For example, the candidate region may be associated with the bi-directional comparison result 702 before the expansion filtering 608 is performed. Furthermore, the first region may be the flagged region 712 and the second region may be the non-flagged region(s) 714. In an example, 1212 may be performed by the mesh stitcher 198.

In one aspect, at 1214, detecting the set of regions in the mesh may further include: determining that a first border of the first region is surrounded by a second border of the second region. For example, FIG. 7 shows that some of the non-flagged region(s) 714 may be surrounded by the flagged region 712. The first region may be surrounded by the second border of the second region when every point on a border of the first region is adjacent to the second border of the second region. In an example, 1214 may be performed by the mesh stitcher 198.

In one aspect, at 1216, detecting the set of regions in the mesh may further include: adjusting, based on the determination, each of the first set of motion disparity values to be less than the coherency threshold, where the detection of the set of regions in the mesh may be based on the adjusted first set of motion disparity values. For example, the expanded bi-directional comparison result 704, and in particular the expanded flagged region 716 shows that detecting the set of regions in the mesh may further include: adjusting, based on the determination, each of the first set of motion disparity values to be less than the coherency threshold, where the detection of the set of regions in the mesh may be based on the adjusted first set of motion disparity values. For instance, FIG. 7 shows that the non-flagged region(s) 714 within the flagged region 712 may not be present within the expanded flagged region 716. In an example, 1216 may be performed by the mesh stitcher 198.

In one aspect, at 1218, detecting the set of regions in the mesh further may include: determining that a portion of a first border of the first region is adjacent to a second border of the second region. For example, FIG. 7 shows that some of the non-flagged region(s) 714 may be adjacent to the flagged region 712. The portion of the first border of the first region may be adjacent to the second border of the second region when point(s) on the portion of the first border of the first region touch point(s) on the second border of the second region. In an example, 1218 may be performed by the mesh stitcher 198.

In one aspect, at 1220, detecting the set of regions in the mesh further may include: adjusting, based on the determination, each of the first set of motion disparity values to be less than the coherency threshold, where the detection of the set of regions in the mesh may be based on the adjusted first set of motion disparity values. For example, the expanded bi-directional comparison result 704, and in particular the expanded flagged region 716 shows that detecting the set of regions in the mesh may further include: adjusting, based on the determination, each of the first set of motion disparity values to be less than the coherency threshold, where the detection of the set of regions in the mesh may be based on the adjusted first set of motion disparity values. In an example, 1220 may be performed by the mesh stitcher 198.

In one aspect, the mesh may include a first point that includes a first motion disparity value greater than the coherency threshold and a second point that includes a second motion disparity value greater than the coherency threshold, where the first point and the second point may be on opposite sides of the set of regions of the mesh, and where the indication of the adjustment to the mesh may indicate that an interpolated motion disparity value for a sub-region of the set of regions is configured to be generated based on the first motion disparity value and the second motion disparity value. For example, the aforementioned aspect may correspond to the stitched mesh 706.

In one aspect, the first point, the second point, and the sub-region may be arranged horizontally within the mesh. For example, the aforementioned aspect may correspond to the stitched mesh 706.

In one aspect, the indication of the adjustment to the mesh may indicate that a single primitive is configured to span the sub-region. For example, the stitched mesh 706 shows that the indication of the adjustment to the mesh may indicate that a single primitive is configured to span the sub-region.

In one aspect, the indication of the adjustment to the mesh may indicate that primitives contained entirely within the set of regions of the mesh are configured to be discarded. For example, the indication of the adjustment to the mesh output at 1012 may indicate that primitives contained entirely within the set of regions of the mesh are configured to be discarded.

In one aspect, the single primitive may be a triangle. For example, the stitched mesh 706 shows that the single primitive may be a triangle that includes the vertex 718. A primitive may refer to a simplest geometric shape that system (e.g., a graphics processing system) may process.

In one aspect, the obtainment of the indication of the mesh, the detection of the set of regions of the mesh, the calculation of the adjustment of the mesh, and the output of the indication of the adjustment of the mesh may occur as part of an extended reality (XR) draw call associated with the plurality of frames. For example, the obtainment of the indication of the mesh at 1006, the detection of the set of regions of the mesh at 1008, the calculation of the adjustment of the mesh at 1010, and the output of the indication of the adjustment of the mesh at 1012 may occur as part of an extended reality (XR) draw call associated with the plurality of frames. An XR draw call may refer to a call to a graphics application programming interface (API) that instructs the graphics API to draw XR content and instructs how the graphics API is to draw the XR content.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for obtaining an indication of a mesh associated with a set of motion vectors for a first frame and a second frame in a plurality of frames. The apparatus may further include means for detecting a set of regions in the mesh including a set of motion disparity values associated with the set of motion vectors, where each motion disparity value in the set of motion disparity values is less than a coherency threshold. The apparatus may further include means for calculating an adjustment to the mesh based on the region. The apparatus may further include means for outputting an indication of the adjustment to the mesh based on the region. The apparatus may further include means for obtaining the plurality of frames, where obtaining the indication of the mesh is based on obtaining the plurality of frames.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, comprising: obtaining an indication of a mesh associated with a set of motion vectors for a first frame and a second frame in a plurality of frames; detecting a set of regions in the mesh including a set of motion disparity values associated with the set of motion vectors, wherein each motion disparity value in the set of motion disparity values is less than a coherency threshold; calculating an adjustment to the mesh based on the region; and outputting an indication of the adjustment to the mesh based on the region.

Aspect 2 may be combined with aspect 1 and comprises that the set of motion disparity values includes at least one of: a set of motion values associated with a set of vectors for a map of a motion difference between the first frame and the second frame; or a set of disparity values associated with a stereo offset between a left-eye image and a right-eye image, wherein the left-eye image and the right-eye image are associated with one or more frames of the plurality of frames.

Aspect 3 may be combined with any of aspects 1-2 and comprises that calculating the adjustment to the mesh includes calculating the adjustment to the mesh during a time warp process associated with an extended reality (XR) device.

Aspect 4 may be combined with any of aspects 1-3 and comprises that calculating the adjustment to the mesh includes calculating the adjustment to the mesh during at least one of a depth from stereo (DFS) process or a motion estimation process.

Aspect 5 may be combined with any of aspects 1-4 and comprises that outputting the indication of the adjustment to the mesh includes transmitting, to a graphics processor, the indication of the adjustment to the mesh.

Aspect 6 may be combined with any of aspects 1-5 and comprises that outputting the indication of the adjustment to the mesh includes storing, in at least one of a memory, a buffer, or a cache, the indication of the adjustment to the mesh.

Aspect 7 may be combined with any of aspects 1-6 and comprises that the set of regions in the mesh is associated with an occlusion in one of the first frame or the second frame, and wherein the adjustment to the mesh is associated with a removal or a mitigation of the occlusion in one of the first frame or the second frame.

Aspect 8 may be combined with any of aspects 1-7 and comprises that detecting the set of regions in the mesh includes: performing, based on the coherency threshold, a bi-directional search on the first frame and the second frame; and identifying a candidate region in the mesh based on results from the bi-directional search, wherein the candidate region includes (1) a first region including a first set of motion disparity values and (2) a second region including a second set of motion disparity values, wherein each motion disparity value in the first set of motion disparity values is greater than the coherency threshold and each motion disparity value in the second set of motion disparity values is less than the coherency threshold, and wherein the detection of the set of regions in the mesh is based on the identified candidate region.

Aspect 9 may be combined with aspect 8 and comprises that detecting the set of regions in the mesh further includes: determining that a first border of the first region is surrounded by a second border of the second region; and adjusting, based on the determination, each of the first set of motion disparity values to be less than the coherency threshold, wherein the detection of the set of regions in the mesh is based on the adjusted first set of motion disparity values.

Aspect 10 may be combined with any of aspects 8-9 and comprises that detecting the set of regions in the mesh further includes: determining that a portion of a first border of the first region is adjacent to a second border of the second region; and adjusting, based on the determination, each of the first set of motion disparity values to be less than the coherency threshold, wherein the detection of the set of regions in the mesh is based on the adjusted first set of motion disparity values.

Aspect 11 may be combined with any of aspects 1-10 and comprises that the mesh includes a first point that includes a first motion disparity value greater than the coherency threshold and a second point that includes a second motion disparity value greater than the coherency threshold, wherein the first point and the second point are on opposite sides of the set of regions of the mesh, and wherein the indication of the adjustment to the mesh indicates that an interpolated motion disparity value for a sub-region of the set of regions is configured to be generated based on the first motion disparity value and the second motion disparity value.

Aspect 12 may be combined with aspect 11 and comprises that the first point, the second point, and the sub-region are arranged horizontally within the mesh.

Aspect 13 may be combined with any of aspects 11-12 and comprises that the indication of the adjustment to the mesh indicates that a single primitive is configured to span the sub-region.

Aspect 14 may be combined with aspect 13 and comprises that the indication of the adjustment to the mesh indicates that primitives contained entirely within the set of regions of the mesh are configured to be discarded.

Aspect 15 may be combined with any of aspects 13-14 and comprises that the single primitive is a triangle.

Aspect 16 may be combined with any of aspects 1-15 and comprises that the obtainment of the indication of the mesh, the detection of the set of regions of the mesh, the calculation of the adjustment of the mesh, and the output of the indication of the adjustment of the mesh occur as part of an extended reality (XR) draw call associated with the plurality of frames.

Aspect 17 is an apparatus for graphics processing comprising a memory and a processor coupled to the memory and, based on information stored in the memory, the processor is configured to implement a method as in any of aspects 1-16.

Aspect 18 may be combined with aspect 17 and includes that the apparatus is a wireless communication device comprising at least one of a transceiver or an antenna coupled to the processor, wherein the processor is configured to obtain the plurality of frames via at least one of the transceiver or the antenna.

Aspect 19 is an apparatus for graphics processing including means for implementing a method as in any of aspects 1-16.

Aspect 20 is a computer-readable medium storing computer executable code, the computer executable code, when executed by a processor, causes the processor to implement a method as in any of aspects 1-16.

Various aspects have been described herein. These and other aspects are within the scope of the following claims.

What is claimed is:

1. An apparatus for graphics processing, comprising:
a memory; and
a processor coupled to the memory and, based on information stored in the memory, the processor is configured to:
  obtain an indication of a mesh associated with a set of motion vectors for a first frame and a second frame in a plurality of frames;
  detect a set of regions in the mesh including a set of motion disparity values associated with the set of motion vectors, wherein each motion disparity value in the set of motion disparity values is less than a coherency threshold and wherein the set of motion disparity values includes at least one of:
    a set of motion values associated with a set of vectors for a map of a motion difference between the first frame and the second frame; or
    a set of disparity values associated with a stereo offset between a left-eye image and a right-eye image, wherein the left-eye image and the right-eye image are associated with one or more frames of the plurality of frames;
  calculate an adjustment to the mesh based on the set of regions; and
  output an indication of the adjustment to the mesh.

2. The apparatus of claim 1, wherein to calculate the adjustment to the mesh, the processor is configured to calculate the adjustment to the mesh during a time warp process associated with an extended reality (XR) device.

3. The apparatus of claim 1, wherein to calculate the adjustment to the mesh, the processor is configured to calculate the adjustment to the mesh during at least one of a depth from stereo (DFS) process or a motion estimation process.

4. The apparatus of claim 1, wherein to output the indication of the adjustment to the mesh, the processor is configured to transmit, to a graphics processor, the indication of the adjustment to the mesh.

5. The apparatus of claim 1, wherein to output the indication of the adjustment to the mesh, the processor is configured to store, in at least one of the memory, a buffer, or a cache, the indication of the adjustment to the mesh.

6. The apparatus of claim 1, wherein the set of regions in the mesh is associated with an occlusion in one of the first frame or the second frame, and wherein the adjustment to the mesh is associated with a removal or a mitigation of the occlusion in one of the first frame or the second frame.

7. The apparatus of claim 1, wherein to detect the set of regions in the mesh, the processor is configured to:
  perform, based on the coherency threshold, a bi-directional search on the first frame and the second frame; and
  identify a candidate region in the mesh based on results from the bi-directional search, wherein the candidate region includes (1) a first region including a first set of motion disparity values and (2) a second region including a second set of motion disparity values, wherein each motion disparity value in the first set of motion disparity values is greater than the coherency threshold and each motion disparity value in the second set of motion disparity values is less than the coherency threshold, and wherein the detection of the set of regions in the mesh is based on the identified candidate region.

8. The apparatus of claim 7, wherein to detect the set of regions in the mesh, the processor is further configured to:
  determine that a first border of the first region is surrounded by a second border of the second region; and
  adjust, based on the determination, each of the first set of motion disparity values to be less than the coherency threshold, wherein the detection of the set of regions in the mesh is based on the adjusted first set of motion disparity values.

9. The apparatus of claim 7, wherein to detect the set of regions in the mesh, the processor is further configured to:
  determine that a portion of a first border of the first region is adjacent to a second border of the second region; and
  adjust, based on the determination, each of the first set of motion disparity values to be less than the coherency threshold, wherein the detection of the set of regions in the mesh is based on the adjusted first set of motion disparity values.

10. The apparatus of claim 1, wherein the mesh includes a first point that includes a first motion disparity value greater than the coherency threshold and a second point that includes a second motion disparity value greater than the coherency threshold, wherein the first point and the second point are on opposite sides of the set of regions of the mesh, and wherein the indication of the adjustment to the mesh indicates that an interpolated motion disparity value for a sub-region of the set of regions is configured to be generated based on the first motion disparity value and the second motion disparity value.

11. The apparatus of claim 10, wherein the first point, the second point, and the sub-region are arranged horizontally within the mesh.

12. The apparatus of claim 10, wherein the indication of the adjustment to the mesh indicates that a single primitive is configured to span the sub-region.

13. The apparatus of claim 12, wherein the indication of the adjustment to the mesh indicates that primitives contained entirely within the set of regions of the mesh are configured to be discarded.

14. The apparatus of claim 12, wherein the single primitive is a triangle.

15. The apparatus of claim 1, wherein to obtain the indication of the mesh, detect the set of regions of the mesh, calculate the adjustment of the mesh, and output the indication of the adjustment of the mesh, the processor is configured to obtain the indication of the mesh, detect the set of regions of the mesh, calculate the adjustment of the mesh, and output the indication of the adjustment of the mesh as part of an extended reality (XR) draw call associated with the plurality of frames.

16. The apparatus of claim 1, wherein the apparatus is a wireless communication device comprising at least one of a transceiver or an antenna coupled to the processor, and wherein to obtain the indication of the mesh, the processor is configured to obtain the indication of the mesh via at least one of the transceiver or the antenna.

17. A method of graphics processing, comprising:
  obtaining an indication of a mesh associated with a set of motion vectors for a first frame and a second frame in a plurality of frames;
  detecting a set of regions in the mesh including a set of motion disparity values associated with the set of motion vectors, wherein each motion disparity value in the set of motion disparity values is less than a coherency threshold and wherein the set of motion disparity values includes at least one of:

a set of motion values associated with a set of vectors for a map of a motion difference between the first frame and the second frame; or a set of disparity values associated with a stereo offset between a left-eye image and a right-eye image, wherein the left-eye image and the right-eye image are associated with one or more frames of the plurality of frames;

calculating an adjustment to the mesh based on the region; and outputting an indication of the adjustment to the mesh.

18. The method of claim 17, wherein calculating the adjustment to the mesh comprises calculating the adjustment to the mesh during a time warp process associated with an extended reality (XR) device.

19. The method of claim 17, wherein calculating the adjustment to the mesh comprises calculating the adjustment to the mesh during at least one of a depth from stereo (DFS) process or a motion estimation process.

20. The method of claim 17, wherein outputting the indication of the adjustment to the mesh comprises transmitting, to a graphics processor, the indication of the adjustment to the mesh.

21. The method of claim 17, wherein outputting the indication of the adjustment to the mesh comprises storing, in at least one of a memory, a buffer, or a cache, the indication of the adjustment to the mesh.

22. The method of claim 17, wherein the set of regions in the mesh is associated with an occlusion in one of the first frame or the second frame, and wherein the adjustment to the mesh is associated with a removal or a mitigation of the occlusion in one of the first frame or the second frame.

23. The method of claim 17, wherein detecting the set of regions in the mesh comprises:

performing, based on the coherency threshold, a bi-directional search on the first frame and the second frame; and identifying a candidate region in the mesh based on results from the bi-directional search, wherein the candidate region includes (1) a first region including a first set of motion disparity values and (2) a second region including a second set of motion disparity values, wherein each motion disparity value in the first set of motion disparity values is greater than the coherency threshold and each motion disparity value in the second set of motion disparity values is less than the coherency threshold, and wherein the detection of the set of regions in the mesh is based on the identified candidate region.

24. The method of claim 23, wherein detecting the set of regions in the mesh further comprises:

determining that a first border of the first region is surrounded by a second border of the second region; and adjusting, based on the determination, each of the first set of motion disparity values to be less than the coherency threshold, wherein the detection of the set of regions in the mesh is based on the adjusted first set of motion disparity values.

25. The method of claim 23, wherein detecting the set of regions in the mesh further comprises:

determining that a portion of a first border of the first region is adjacent to a second border of the second region; and adjusting, based on the determination, each of the first set of motion disparity values to be less than the coherency threshold, wherein the detection of the set of regions in the mesh is based on the adjusted first set of motion disparity values.

26. The method of claim 17, wherein the mesh includes a first point that includes a first motion disparity value greater than the coherency threshold and a second point that includes a second motion disparity value greater than the coherency threshold, wherein the first point and the second point are on opposite sides of the set of regions of the mesh, and wherein the indication of the adjustment to the mesh indicates that an interpolated motion disparity value for a sub-region of the set of regions is configured to be generated based on the first motion disparity value and the second motion disparity value.

27. The method of claim 26, wherein the first point, the second point, and the sub-region are arranged horizontally within the mesh.

28. A computer-readable medium storing computer executable code, the computer executable code, when executed by a processor, causes the processor to:

obtain an indication of a mesh associated with a set of motion vectors for a first frame and a second frame in a plurality of frames;

detect a set of regions in the mesh including a set of motion disparity values associated with the set of motion vectors, wherein each motion disparity value in the set of motion disparity values is less than a coherency threshold and wherein the set of motion disparity values includes at least one of:

a set of motion values associated with a set of vectors for a map of a motion difference between the first frame and the second frame; or a set of disparity values associated with a stereo offset between a left-eye image and a right-eye image, wherein the left-eye image and the right-eye image are associated with one or more frames of the plurality of frames;

calculate an adjustment to the mesh based on the set of regions; and output an indication of the adjustment to the mesh.

29. The computer-readable medium of claim 28, wherein the set of regions in the mesh is associated with an occlusion in one of the first frame or the second frame, and wherein the adjustment to the mesh is associated with a removal or a mitigation of the occlusion in one of the first frame or the second frame.

30. The computer-readable medium of claim 28, wherein to detect the set of regions in the mesh, the computer executable code, when executed by the processor, further causes the processor to:

perform, based on the coherency threshold, a bi-directional search on the first frame and the second frame; and identify a candidate region in the mesh based on results from the bi-directional search, wherein the candidate region includes (1) a first region including a first set of motion disparity values and (2) a second region including a second set of motion disparity values, wherein each motion disparity value in the first set of motion disparity values is greater than the coherency threshold and each motion disparity value in the second set of motion disparity values is less than the coherency threshold, and wherein the detection of the set of regions in the mesh is based on the identified candidate region.

* * * * *